United States Patent
Graczyk et al.

(10) Patent No.: US 8,766,780 B2
(45) Date of Patent: Jul. 1, 2014

(54) ASSET TRACKING SYSTEM INCLUDING A TAG CONTROLLER

(75) Inventors: Ronald Graczyk, Cedar Park, TX (US); Ryan Joy, Austin, TX (US)

(73) Assignee: RF Code, Inc., Austin, TX (US)

(\*) Notice: Subject to any disclaimer, the term of this patent is extended or adjusted under 35 U.S.C. 154(b) by 533 days.

(21) Appl. No.: 12/957,880

(22) Filed: Dec. 1, 2010

(65) Prior Publication Data

US 2011/0128129 A1 Jun. 2, 2011

Related U.S. Application Data

(60) Provisional application No. 61/265,631, filed on Dec. 1, 2009.

(51) Int. Cl.
*H04Q 5/22* (2006.01)
*G06K 7/10* (2006.01)

(52) U.S. Cl.
CPC .................. *G06K 7/10326* (2013.01)
USPC ...... 340/10.5; 340/10.4; 340/10.3; 340/572.1

(58) Field of Classification Search
CPC .................... G06K 7/10326; G06K 19/07788
USPC ................ 340/854.8, 855.1, 10.33; 455/701; 235/492
See application file for complete search history.

(56) References Cited

U.S. PATENT DOCUMENTS

| | | | |
|---|---|---|---|
| 5,917,425 A * | 6/1999 | Crimmins et al. | 340/8.1 |
| 2004/0195334 A1 | 10/2004 | Silverbrook et al. | |
| 2005/0114646 A1 * | 5/2005 | Rekimoto et al. | 713/150 |
| 2005/0201301 A1 * | 9/2005 | Bridgelall | 370/254 |
| 2005/0206503 A1 * | 9/2005 | Corrado et al. | 340/10.5 |
| 2006/0032922 A1 | 2/2006 | Philyaw et al. | |
| 2006/0071085 A1 | 4/2006 | Philyaw et al. | |
| 2008/0144186 A1 | 6/2008 | Feng et al. | |
| 2008/0163504 A1 | 7/2008 | Smith et al. | |
| 2009/0193295 A1 * | 7/2009 | Drost et al. | 714/32 |
| 2010/0117796 A1 * | 5/2010 | Claessen | 340/10.1 |
| 2011/0057291 A1 * | 3/2011 | Slupsky et al. | 257/531 |

FOREIGN PATENT DOCUMENTS

| WO | WO 2005/067608 A2 | 7/2005 |
|---|---|---|
| WO | WO 2008/086616 A1 | 7/2008 |

\* cited by examiner

*Primary Examiner* — Daniel Wu
*Assistant Examiner* — Frederick Ott
(74) *Attorney, Agent, or Firm* — Larson Newman, LLP

(57) ABSTRACT

A tag includes a processor, a radio frequency transmitter coupled to the processor, and a capacitively driven communication circuitry coupled to the processor. The processor is to energize the capacitively driven communication circuitry to receive a serial set of binary bits via the capacitively driven communication circuitry.

4 Claims, 7 Drawing Sheets

ASSET TRACKING SYSTEM INCLUDING A TAG CONTROLLER

CROSS-REFERENCE TO RELATED APPLICATION(S)

The present application claims priority from U.S. Provisional Patent Application No. 61/265,631, filed Dec. 1, 2009, entitled "ASSET TRACKING SYSTEM INCLUDING A TAG CONTROLLER," naming inventors Ronald Graczyk and Ryan Joy, which application is incorporated by reference herein in its entirety.

FIELD OF THE DISCLOSURE

This disclosure, in general, relates to asset tracking systems, and in particular, to asset tracking systems that include tag controllers.

BACKGROUND

With the increasing complexity of commercial organizations, industry is seeking to track the location and use of inventory and equipment with increasing specificity and detail. Accordingly, various industries are turning to asset tracking systems that include electronically readable identification tags. More recently, industry has turned to active identification systems, such as active radio frequency identification systems. Active radio frequency identification systems generally include radio frequency identification tags that periodically transmit radio frequency signals. To facilitate transmission of the periodic signals, the active radio frequency identification tags typically include an internal power source and a radio frequency transmitter. However, many jurisdictions restrict the transmission of radio frequency signals and the internal power sources of such radio frequency identification tags are often limited in the total amount of power that can be supplied.

Radio frequency transmissions are typically regulated by various jurisdictions including countries and international regulatory authorities in which a radio frequency identification tag can be used. In particular, radio frequency transmissions are often limited, discouraged, and restricted in transportation vehicles such as airplanes. Conventional radio frequency identification tags are often manufactured in one country and transported to another country for use. As such, radio frequency transmissions emanating from the radio frequency identification tags may be regulated by more than one jurisdiction and may be prohibited or restricted during transport.

In addition, power supplies of conventional radio frequency identification tags are limited and expensive to replace relative to the cost of the tag. Power expended between a time of manufacture and a time of use is wasted.

Accordingly, an improved asset tracking system would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
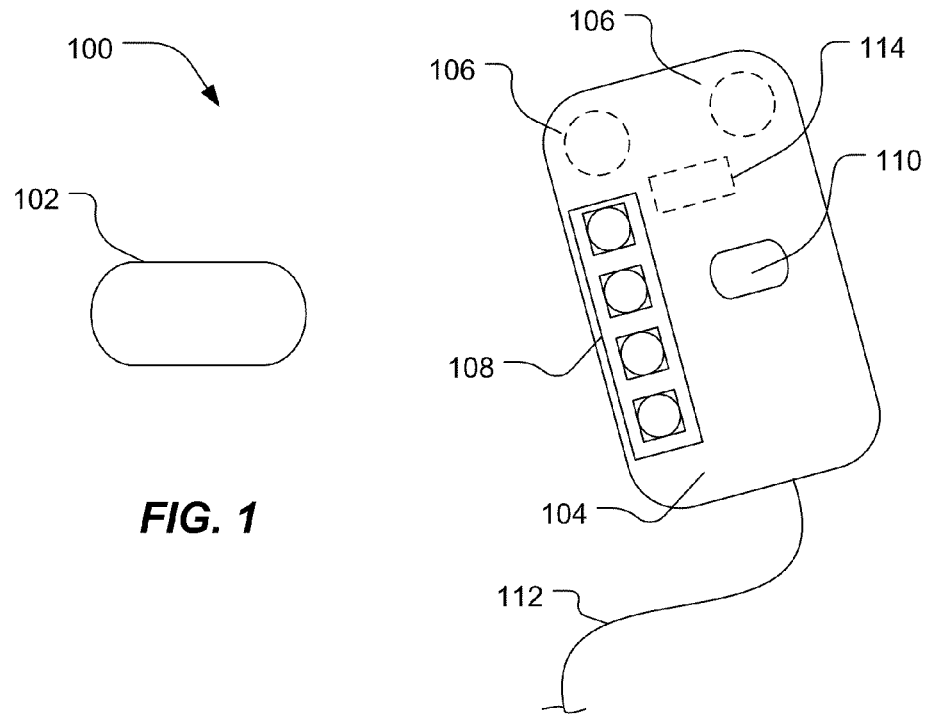
FIG. 1 and FIG. 2 include illustrations of exemplary asset tracking systems.

In a particular embodiment, an asset tracking system includes an identification tag and a tag controller. In an example, the identification tag includes a tag processor, a radio frequency transmitter, and a capacitively driven communication circuitry. The tag controller can include a tag controller processor, an interface connected to the tag controller processor, a drive circuitry connected to the tag controller processor and a voltage pad (e.g., two or more voltage pads) coupled to the drive circuitry. In addition, the tag controller can include a radio frequency receiver. In an example, a tag controller processor and drive circuitry of the controller can manipulate charge on the voltage pads that capacitively changes the charge associated with a capacitively driven communication circuitry of the tag to provide a serial set of binary bits including a command interpretable by the tag processor of the tag. In particular, the command can direct the tag processor to power down at least portions of the tag processor, power up portions of the tag processor, initiate transmission of a radio frequency (RF) signal via the radio frequency transmitter, or provide power to various communication circuitries. In a further example, the asset tracking system can also include a host computer system that can be coupled to the tag controller, a radio frequency reader or antenna coupled to the host computer system that can receive radio frequency transmissions from the tag, or a beacon device that can communicate with the tag through methods other than the capacitively driven communication circuitry. The radio frequency (RF) reader or antenna can be a wide area radio frequency (RF) reader or antenna coupled to the host computer system directly or via a network. The wide area RF reader or antenna can receive signals from a plurality of tags distributed throughout an area being monitored. Alternatively or in addition, the RF reader or antenna can be part of the tag controller and can communicate with the host computer system via the tag controller.

In a particular aspect, the asset tracking system can be operated to cause a tag to transmit data or a beacon signal at a particular time, as opposed to waiting for a transmission during a periodic cycle, or can be operated to cause a tag to transmit at a particular location, as opposed to waiting for a moving tag to transmit during a periodic cycle when it may move away from the particular location prior to transmitting. As such, the asset tracking system can be used to correlate known signals or events with other RF wide area signals, and in particular, correlate signals with particular locations or at particular times in the context of wide area tracking of assets. In an example, such a system can be particularly useful in retail asset tracking including checkout scanning.

In another aspect, the asset tracking system can provide low cost tags that include a bidirectional communication channel without the expense of a radio frequency receiver. Conventional low cost tags have unidirectional radio frequency transmitters. In contrast, the present tags can include a capacitively driven communications circuitry that can receive commands, data, or parameters and can provide a response via a radio frequency transmitter. For example, the tag can provide several different transmissions depending on the commands received at the tag. In an example, such transmissions can include a normal beacon signal, a low information response signal, or a special beacon signal including payload data. A normal beacon signal is a signal to be received by a wide area RF reader and providing a tag identification and optionally location data. Generally, the tag transmits the normal beacon signal periodically according to a transmission schedule or algorithm. In addition, the tag can be commanded to transmit the normal beacon signal immediately and outside of its periodic transmission schedule.

In another example, the tag can be commanded to transmit a low information response signal. The low information response signal can be provided to a tag controller to acknowledge receipt or implementation of a command received from the tag controller. In an example, the low information response signal can be transmitted with a protocol that prevents recognition of the low information response signal by the wide area RF reader. For example, the low information response signal can be transmitted with fixed patterned data or can be transmitted over a longer period.

In a further example, the tag can be commanded to provide a special beacon signal including, for example, a payload. In particular, the command can indicate which data is to be transmitted. The tag can respond, for example, immediately with a special beacon signal including payload data with the data requested by the tag controller. The special beacon signal can be transmitted to the tag controller or the payload data can be included in a normal beacon signal with the additional payload transmitted to the wide area RF reader.

As illustrated in FIG. 1, a portion of an asset tracking system 100 can include a tag 102 and a controller 104. The tag 102 includes a capacitively driven communication circuitry (not illustrated) that can receive a serial set of binary bits through changes in charge on the capacitively driven communication circuitry. The tag controller 104 includes voltage pads 106 on which charge can be manipulated to drive changes in the capacitively driven communication circuitry of the tag 102. In addition, the tag controller 104 can include a radio frequency receiver 114, which can be configured to receive low information signals, special beacon signals, and normal beacon signals from the tag 102. In particular, the RF receiver 114 can receive low information signals indicating confirmation that a tag 102 has received or implemented a command.

In an example, the controller 104 can include an interface 108 and a mode button 110. In addition, the controller 104 can include a wired interface 112 or a wireless interface (not illustrated). For example, the wired interface 112 can be a network interface, a parallel interface, or a serial interface. In particular, the wired interface 112 can be a serial interface, such as a universal serial bus (USB) interface that can be connected to a host computer. A wireless interface can utilize a wireless protocol, such as Bluetooth®, an IEEE 802.xx protocol, or a proprietary protocol. Alternatively, the controller 104 can act in stand-alone mode without a connection to a host system.

In a particular example, the interface 108 includes a set of indicator lights indicating the nature of the command to be transmitted to the tag 102. For example, the indicator lights can include a beacon now light, a wake command indicator light, a program indicator light, a sleep indicator light, or any combination thereof. Further, the interface 108 can include a power indicator light to indicate that the controller 104 has power and is operational. Alternatively, the controller 104 can include a visual display, such as a graphics display, a liquid crystal display (LCD), a light emitting diode (LED) display, or any combination thereof, among others. The controller 104 can also include an audio enunciator (not illustrated). For example, the audio enunciator can be activated to provide an audible signal in response to receipt of a confirmation or response signal from a tag sent in response to the command from the controller 104.

In addition, the controller 104 can include a mode button 110. For example, the mode button 110 can be used to cycle between command types to be transmitted via voltage pads 106. In a particular embodiment, the mode button 110 must be depressed to facilitate transmission of a command, such as a sleep command. Alternatively, the interface 108 can include buttons for selecting commands. In such an example, the mode button 110 can be utilized to initiate a selected command. In another embodiment, the mode or command can be selected at a host computer and transferred to the controller 104 via the wired interface 112 or a wireless interface (not illustrated). In such an example, the interface 108 can include indicator lights indicating the mode selected at the host computer and transferred to the controller 104. In such an embodiment, the mode button 110 can be used to initiate transmission of the command. While the controller 104 is illustrated as a hand-held unit, the controller 104 can be built into a checkout stand, a bulkhead, or other enclosures.

The tag 102 can be configured to receive commands from the controller 104. In particular, the tag 102 can be configured to receive and apply a sleep command, a beacon now command, a wake command, or a program command, or any combination thereof. For example, in response to the sleep command, the tag 102 can power down various circuitry, such as a radio frequency transmitter, an infrared receiver, and portions of a processor. In another example, in response to the wake command, the tag 102 can enable communication circuitries and portions of the processor to transmit periodic messages, referred to herein as "normal mode." In a further example, in response to the beacon now command, the tag 102 can immediately initiate transmission of a beacon signal, for example, having the same configuration as a beacon signal transmitted during a normal mode. In a particular example, the tag 102 can transmit a beacon signal without transitioning into normal mode, such as a mode in which the tag 102 transmits periodic signals.

In a further example, the controller 104 can program the tag 102. For example, in response to a program command, the tag 102 can be configured. A programmed configuration can include parameters associated with beacon rates, beacon message content such as static payload data, dynamic payload data received from a sensor, location codes or message formatting, or any combination thereof. In an example, the controller 104 can program the tag 102 with a new beacon interval, identification number, signal strength or sensor data to be reported via a radio frequency transmitter.

In an additional example, the controller includes an RF receiver 114 to receive RF signals from the tag 102. In an example, the RF signal from the tag 102 can be a normal beacon signal. In another example, the RF signal can be a communication having a protocol different from signals that can be interpreted by a wide area RF network. In an example, transmissions from the tag 102 can include a normal beacon signal, a low information response signal, or a special beacon signal including payload data. A normal beacon signal can be received by the RF receiver 114 or a wide area RF reader and can provide a tag identification and optionally location data. In addition, the tag 102 can be commanded by the controller

104 to transmit a signal similar to the normal beacon signal immediately and outside of its periodic transmission schedule.

In another example, the tag 102 can transmit a low information response signal to be received by the RF transmitter 114, such as in response to a command from the controller 104. The low information response signal can be provided to the RF receiver 114 of the controller 104 to acknowledge receipt or implementation of a command received from the controller 104. In an example, the low information response signal can be transmitted with a protocol that prevents recognition of the low information response signal by the wide area RF reader. For example, the low information response signal can be transmitted with fixed patterned data or can be transmitted over a longer period.

In a further example, the tag 102 can provide a special beacon signal including, for example, a payload, as commanded by the controller 104. In particular, the command can indicate which data is to be transmitted. The tag 102 can respond, for example, immediately with a special beacon signal including payload data with the data requested by the controller 104. The special beacon signal can be transmitted to be received by the RF receiver 114 of the controller 104 or payload data can be included in a normal beacon signal with an additional payload transmitted to the wide area RF reader.

Further, the controller 104 can transfer a parameter to the tag 102. In an example, the tag 102 can respond with a low information response signal to be received by the RF receiver 114 to indicate receipt of the parameter. An exemplary parameter includes parameters associated with beacon rates, beacon message content such as static payload data, dynamic payload data received from a sensor, location codes or message formatting, sensor data, identification numbers, signal strength, or any combination thereof. In a further example, the controller 104 can transfer a parameter to the tag 102 to be transmitted as part of a communication to a wide area RF network. Such a parameter can be used in conjunction with operability testing or to indicate that the controller 104 is in communication with the tag 102.

Figure 2:
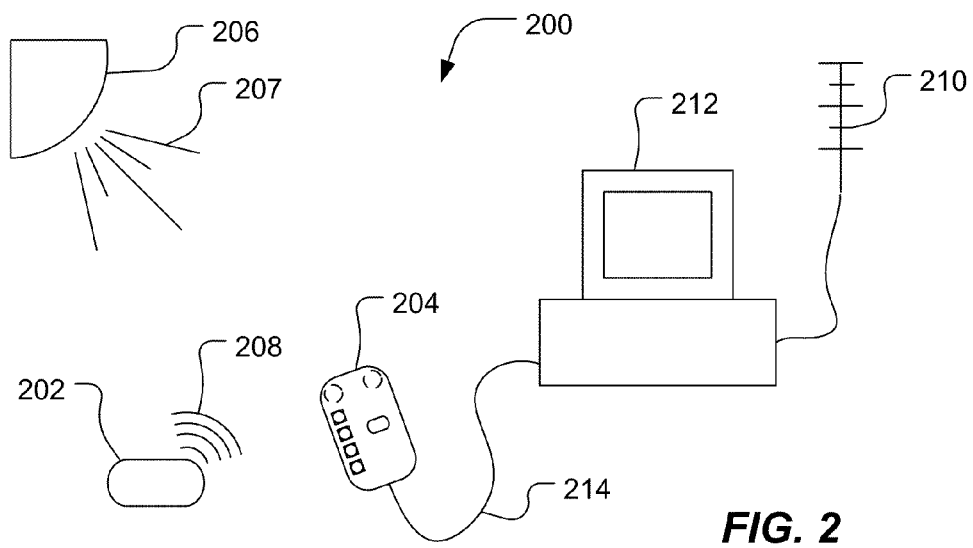

In another embodiment illustrated in FIG. 2, an asset tracking system 200 includes a plurality of asset tracking tags, such as tag 202, and a controller 204. In addition, the asset tracking system 200 can include a location beacon device 206 and a host computer 212. The host computer 212 can be coupled to a reader or an antenna, such as a radio frequency antenna 210. Optionally, the host computer 212 communicates with the controller 204 via a wired interface 214 or a wireless interface (not illustrated).

In an example, the tag 202 includes a radio frequency transmitter that transmits a radio frequency signal 208 that can be received by the reader or the radio frequency antenna 210. The radio frequency signal 208 can include data, such as tag identification numbers, group numbers, location codes, payload data, or combinations thereof. Exemplary payload data includes tag sensor data, data received by the tag controller such as location information, or tag-external sensor data. The tag 202 can further be configured with wake functionality, beacon now functionality, sleep functionality, programmable functionality, or any combination thereof. Alternatively, the controller 204 can include a radio frequency receiver for receiving signals from the tag 202 and communicating them to the host computer 212 via the wired interface 214 or a wireless interface (not illustrated).

In an example, the host computer 212 can include software and interfaces through which a user can specify commands or programming to be transmitted to the tag 202. In response to the input by a user, the computer 212 can configure the controller 204 via the wired interface 214 or a wireless interface (not illustrated) to transmit the command or programming to the tag 202.

Further, the tag 202 can be configured to implement commands, such as a sleep command, when a correct password is provided by the controller 204. In such an example, a user can enter the password through the computer 212, which provides the password to the controller 204. The control 204 transmits the password with the command to the tag 202. Such functionality is particularly useful with the sleep command. For example, the tag 202 can implement the sleep command only when a correct password is received in conjunction with the sleep command. Such a configuration prevents unauthorized deactivation of tags.

In an embodiment, the tag 202 responds to particular communications when the password associated with the command is correct. For example, the tag 202 can respond to a sleep command when the password is correct. In an example, a user can enter a password through the host computer 212. The host computer 212 provides the password to the controller 204 to be included with the command. The password can be specific for each tag 202. Alternatively, the password can be shared by tags 202 within a group of tags. In another example, the password can be included in a password file. Once the host computer 212 has the identity of the tag 202, the host computer can reference the password file to acquire the password. For example, the tag 202 can provide a beacon signal including its identification, and the host computer 212 can determine the tag identification, recognize the tag identification, lookup a password associated with the tag identification, and provide the password to a controller 204 for use in programming the tag 202.

In a further example, operability and configuration of a tag, such as tag 202, can be tested using radio frequency communication received through the reader or the antenna 210. For example, the host computer 212 can configure the controller 204 to provide a wake command or a beacon now command to the tag 202. In response, the tag 202 can provide a radio frequency signal 208, which is received by the reader or the antenna 210. The host computer 212 can receive and analyze the signal to determine whether the tag is operating with the correct configuration and to acquire data from the tag 202. For example, a new tag in sleep mode can be activated and configured for application to an asset. To configure the tag 202, the host computer 212 can direct the controller 204 to issue a wake command to the tag 202 or to issue a beacon now command to the tag 202. In response, the tag 202 can power up and provide a beacon signal as part of radio frequency signal 208. In particular, the radio frequency signal 208 can include the tag's identification or other information associated with the tag 202. The host computer 212 can receive the tag identification via the reader or the antenna 210 and a user can use the tag identification to further configure the tag 202 or to associate the tag 202 with an asset in an asset tracking system.

In a particular example, the user can program the tag 202. For example, the user can provide the tag's password and a set of configuration commands to be transmitted by the controller 204. In response to receiving a command from the controller 204 with the correct password, the tag 202 can implement the configuration associated with the configuration command. In a further example, the user can provide a password and the sleep command. In response to receiving the correct password and the sleep command, the tag 202 can provide a response including a group identification, a tag identification, and a payload indicating that it received a sleep command. Subsequently, the tag 202 can deactivate or power down various communication circuitries or portions of a tag processor. For example, the tag 202 can deactivate the radio frequency transmitter or transceiver, an infrared receiver, and portions of a tag processor to conserve power. In another example, the tag 202 can receive a wake command and can transmit a response including a group identification, a tag identification and a payload indicating receipt of the wake command. Similarly, the tag 202 can receive a beacon now command and can transmit a group identification and a tag identification. In a particular example, the tag 202 can receive a command to provide a special beacon signal to be transmitted to either a wide area reader or antenna 210 or to a receiver of the controller 204. The special beacon can include a payload indicating the controller that caused the beacon, such as a controller identification or location. In another example, the payload can include controller specific payload data, such as sensor data. In a particular embodiment, a command can indicate a signal strength and the tag 202 can transmit with the indicated signal strength. For example, when the controller 204 includes a radio frequency receiver, the command can indicate a low signal strength that can be received by the controller 204 and not the reader or the antenna 210.

In a particular example, the tag 202 can be configured to provide a controller confirmation message or low information response signal that takes the form of a low complexity signal for receipt by the controller 204. The controller confirmation message can have a different format than a beacon signal or a periodic transmission from the tag 202. For example, the controller confirmation message can be transmitted when the controller command stops. In an example, the controller confirmation message is transmitted within a short time, such as beginning within 12.5 milliseconds.

Other exemplary commands include a set beacon command through which a user can set a beacon rate for the tag, a set identity command through which a user can modify an identification number of the tag, a new identity command through which a user can reinitialize a tag, providing a new set of identifiers, or a command to provide a controller defined payload to be included in particular communications.

In a further example, the asset tracking system 200 includes a location beacon device 206 that transmits a location signal 207. In a particular example, the location beacon device 206 includes an infrared transmitter transmitting a location code within the location signal 207. In operation, the tag 202 can receive the location code from the location beacon device 206 and transmit the location code as part of the radio frequency signal 208. The radio frequency signal 208 can also include a tag's identification and other payload data associated with the tag. In such a manner, a computer connected to a reader or an antenna, such as antenna 210, can determine the location and identity of the tag 202. In another example, the controller 204 can provide a location code or controller identification, for example, to be substituted for the location code received from the location beacon device 206. In such a manner, a correlation can be made with the tag 202 and a fixed location controller or a mobile controller, such as the controller 204.

During configuration, the tag 202 can be tested to determine whether the tag 202 can receive the location signal 207 issued by the location beacon device 206. For example, the host computer 212 can direct the controller 204 to program the tag 202 to issue a radio frequency signal 208 that includes the tag's identification and its location, such as identified in the location signal 207. In response to receiving the signal 208, the host computer 212 can determine whether the tag 202 is operating as programmed. In other examples, the tag 202 can be coupled to a portable sensor and can be configured using the controller 204 and optionally the host computer 212 to acquire data from the sensor via the capacitively driven communication circuitry and to transmit the data as part of the radio frequency signal 208.

In particular, the controller 204 communicates with the tag 202 using a capacitively driven communication circuitry. In a particular embodiment, the configuration and power associated with the capacitively driven communication circuitry can be limited to allow communications with the tag within a range of 2 feet, such as within a range of 1 foot, within a range of 10 inches or even within a range of 6 inches.

Figure 3:
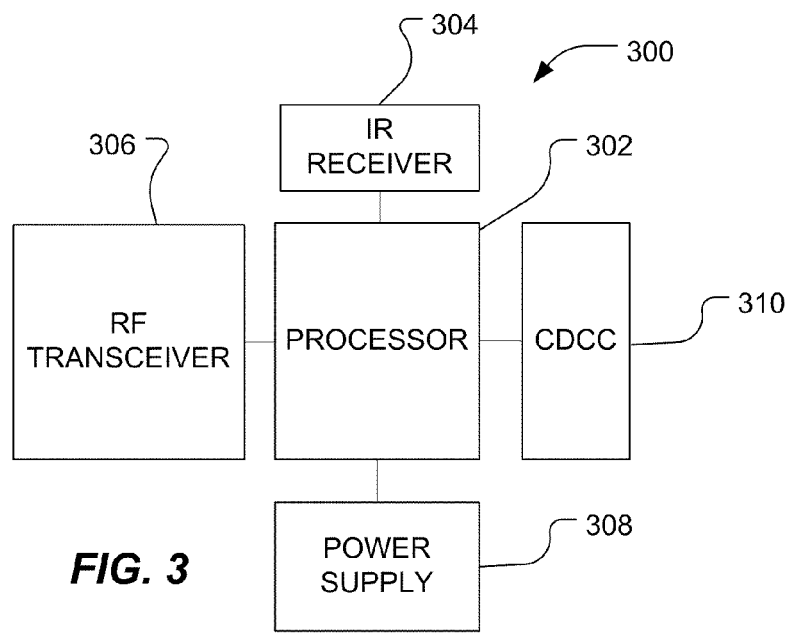
FIG. 3 and FIG. 4 include illustrations of exemplary identification tags.

FIG. 3 includes an illustration of an exemplary tag circuitry 300. For example, the tag 300 can include a tag processor 302 and a capacitively driven communication circuitry (CCDC) 310. In particular, the tag processor 302 is configured for low input current and has low power modes that reduce power consumption of portions of the tag processor 302. In addition, the tag can include power source 308 and other communications circuitry, such as a radio frequency transceiver 306 or an infrared receiver 304. While a radio frequency transceiver 306 is identified, much of the functionality discussed below can alternatively be implemented with a radio frequency transmitter. While the power source 308 is illustrated as being connected to the tag processor 302, the power source 308 can be connected to other circuitry, such as the radio frequency transceiver 306 and the infrared receiver 304.

In operation, the tag 300 can receive a location code, for example, from an infrared transmitter via the infrared receiver 304. The tag processor 302 can store the location code in associated memory and can initiate transmission of a radio frequency signal that includes the tag's identification number, the location code, other payload data, or any combination thereof via the radio frequency transceiver 306.

Further, the tag processor 302 can receive a serial stream of binary bits representing commands via the capacitively driven communication circuitry 310. In particular, the tag processor 302 can receive a sleep command and can power down or reduce power consumption by powering down communication circuitries, such as the infrared receiver 304 and the radio frequency transceiver 306. Further, the tag processor 302 can power down portions of the tag processor 302 in response to the sleep command. When in sleep mode, the tag processor 302 can periodically check the capacitively driven communication circuitry 310 to determine whether another command has been received.

In an example, the capacitively driven communication circuitry 310 detects the alternating differences in charge initiated by a controller or sensor. The capacitively driven communication circuitry 310 can include one or more pads and circuitry to measure differences in charge on the pads or between a pad and ground. The circuitry can include a comparator circuit, a field effect transistor (FET), an OP AMP, or combinations thereof, among others. In particular, the capacitively driven communication circuitry 310 can include two pads and a circuitry to compare charge between the pads.

Figure 4:
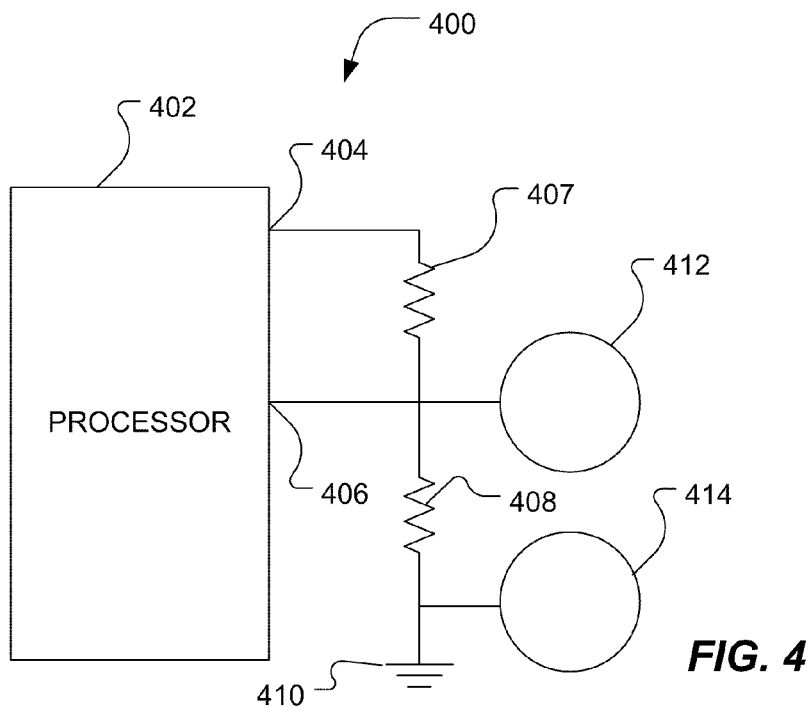

As illustrated in the exemplary embodiment of FIG. 4, a capacitively driven communication circuitry 400 can be coupled to the pins 404 and 406 of a tag processor 402. In particular, the capacitively driven communication circuitry 400 can include a voltage pad 412 and optionally, a voltage pad 414. In addition, a pin 404 of the tag processor 402 can be connected to ground 410 via two resistors, 407 and 408 in series. The voltage pad 412 can be connected between the two resistors 407 and 408 and the pin 406 can be connected between the two resistors 407 and 408. The voltage pad 414 is grounded and acts as a reference to determine changes in charge on voltage pad 412. In an example, the processor 402 can include a connection to ground to which the charge on voltage pad 412 can be compared.

In operation, a controller drives charge on the voltage pad 412, which changes the voltage on pin 406. In particular, when the charges on pads of the controller are changed to a first configuration, the charge on the voltage pad 412 becomes negative and when the charges on pads of the controller are changed to a second configuration, the charge on the voltage pad 412 becomes positive. The processor 402 can apply power to pin 404 and measure the voltage at pin 406 to determine whether a signal has been received. When in sleep mode, a large portion of the processor 402 can be powered down and the capacitively driven communication circuitry periodically checked to determine whether a signal is being received.

Figure 5:
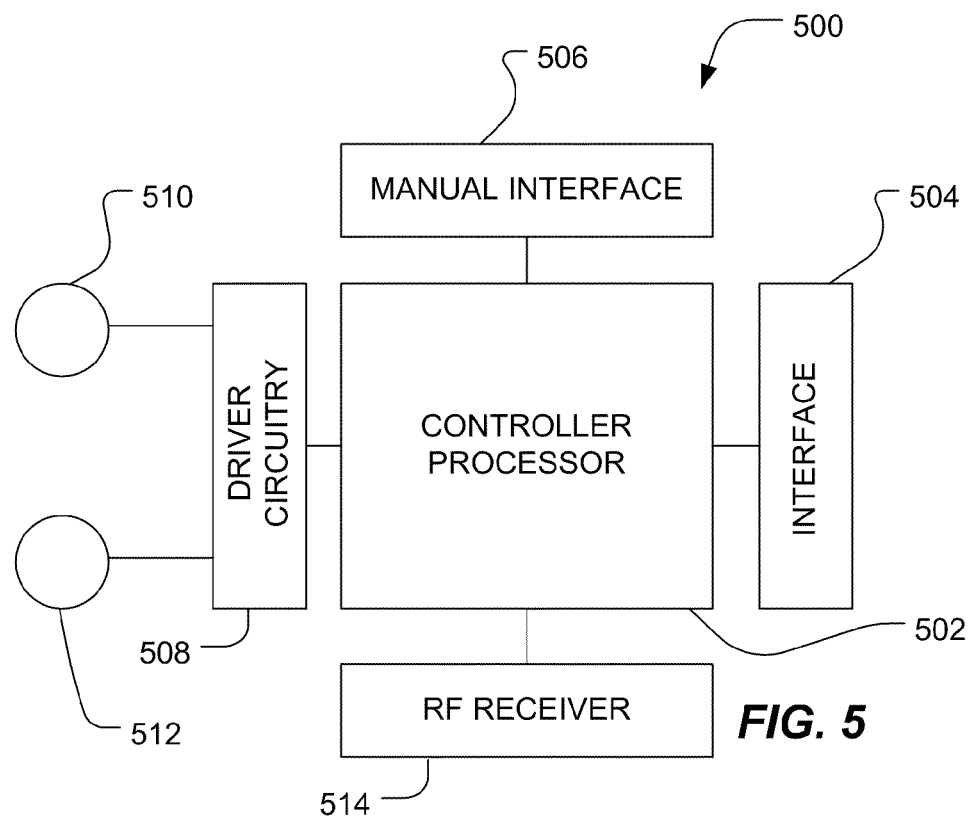
FIG. 5 includes an illustration of an exemplary tag controller.

Turning to the controller, a controller 500 illustrated in FIG. 5 includes a controller processor 502. The controller processor 502 can be connected to a drive circuitry 508 that drives the charge on one or more voltage pads 510 and 512. The controller processor 502 can also be connected to interfaces, such as an interface to a host computer 504 or a manual interface 506. In response to commands received via one or more of the interfaces 504 and 506, the processor 502 can direct the drive circuitry 508 to change the charge on pads 510 and 512 in a pattern representative of a serial stream of binary bits.

In a particular embodiment, the controller 500 includes two voltage pads 510 and 512. The drive circuitry 508 can be configured to drive the voltage pads 510 and 512 in opposite directions. For example, when the charge is increased on pad 512, the charge can be decreased on 510. The alternation of charge on the pads 510 and 512 facilitates coupling of information from the controller 500 to a tag. Alternatively, the charge can be driven by drive circuitry 508 to be the same on voltage pad 510 and as on voltage pad 512.

In an example, the interface 506 is an interface, such as a manual interface, a visual interface, or an auditory interface. For example, the manual interface can include a keypad, a button, a switch, or any combination thereof. In another example, the visual interface can include lights or an screen. In a further example, the auditory interface can include a speaker. The interface 504 can be a communications interface to another computational device, such as a wired parallel interface, a wired serial interface, or a wireless interface. In an example, the interface 504 is a USB interface. In another example, the interface 504 is a Bluetooth interface or an IEEE 802.x interface.

Optionally, the controller 500 can include a receiver 514, such as a radio frequency (RF) receiver, in communication with the controller processor 502. In an example, the receiver 514 can receive communications from a tag. For example, the tag can issue an RF communication in response to communications from the controller 500 sent through the driver circuitry 508 and voltage pads 510 and 512. Such RF communications can be communications sent to a system to provide identification and location. Alternatively, the tag can be configured to transmit low complexity RF communications in response to communications from the controller 500. Such low complexity RF communications can be directed to the controller 500, using protocols specific to the controller 500 that may not match communications protocols used by a wide area RF network of an asset tracking system.

Figure 6:
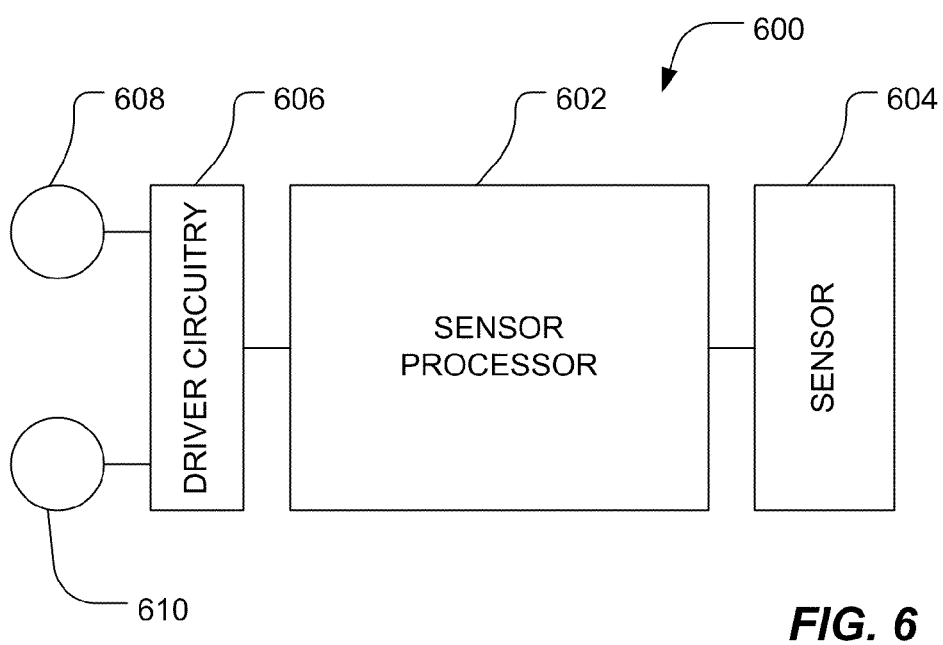
FIG. 6 includes an illustration of an exemplary sensor device.

In another embodiment illustrated in FIG. 6, a capacitively driven communication circuitry can be provided to a sensor device 600. For example, the sensor device 600 can include a sensor processor 602 coupled to a sensor 604. In an example, the sensor 604 can measure parameters, such as temperature, humidity, weight, pressure, or any combination thereof. The sensor processor 602 can periodically control drive circuitry 606 to manipulate the charge on voltage pads 608 and 610 to transmit data associated with the sensor 604 as a serial stream of binary bits. The alternation of charge on the pads 608 and 610 facilitates coupling of information from the sensor 600 to a tag. When placed in proximity to the capacitively driven communication circuitry of a tag, the sensor device 600 can direct the tag to include sensor data in the tag's transmissions. For example, the tag can transmit its identification and the sensor data. Optionally, the tag can also transmit a location code, such as a location code received from a location beacon device. As such, both the controller and a sensor can utilize the capacitively driven communication circuitry to provide data or commands to a tag.

Figure 7:
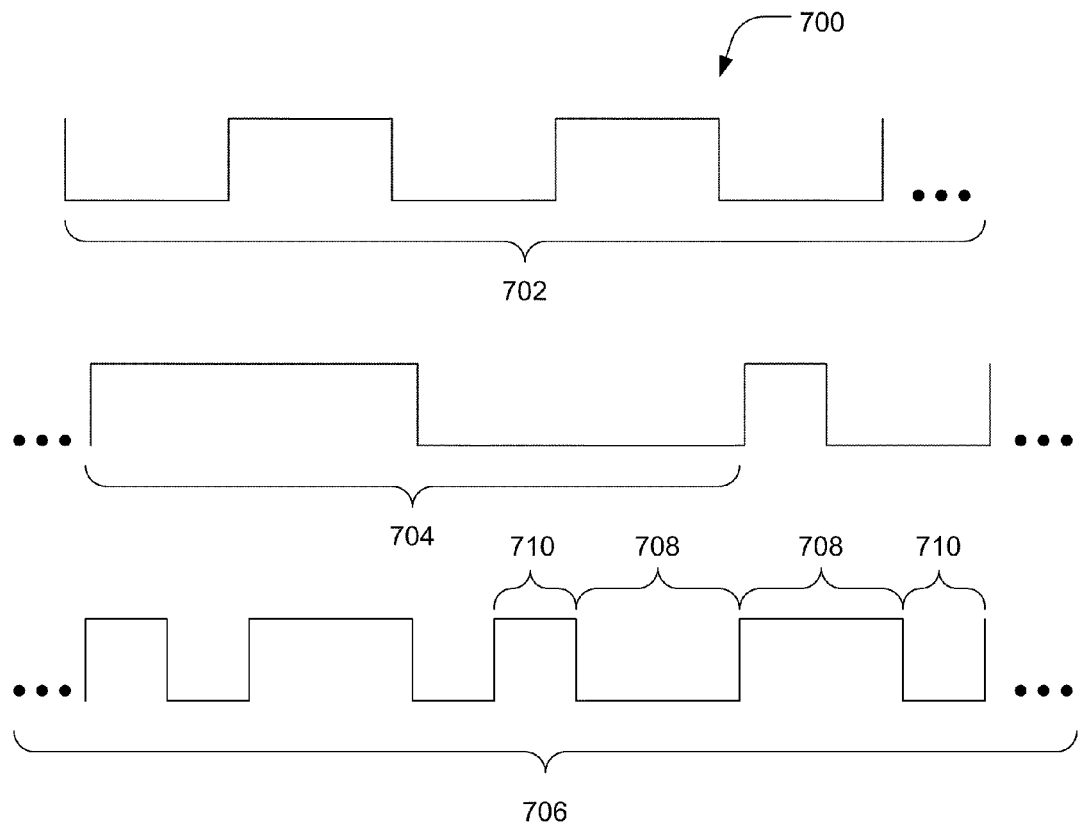
FIG. 7 includes an illustration of an exemplary signal.

In an example, data is provided via the capacitively driven communication circuitry in a serial stream of binary bits. The binary bits can be derived from the change in voltage or timing between the change in voltage at a pin of the tag processor. In a particular example, the value of a binary bit is determined based on the interval between voltage changes. As illustrated in FIG. 7, an exemplary signal includes an initial set of voltage changes 702 identifiable by the tag as being purposefully driven as opposed to noise. For example, the initial set of voltage changes can be a set of binary 1s, a set of binary 0s, or a set of alternating binary 1s and 0s. Following the initial set of voltage changes 702, a set of synchronization bits 704 can be provided. For example, the synchronization bits, such as two synchronization bits, can be provided which are of a specified length. In particular, the specified length can be longer in time relative to intervals designated as 0 or 1. In an example, the synchronization bits can be represented by intervals of approximately 500 microseconds. Following the synchronization bits, a serial stream of data bits 706 can be provided. The value of the bits can be determined based on the interval between voltage changes. For example, a bit value of 1 (708) can be represented by a voltage change interval that is at least twice as long as a bit value 0 (710). In an example, a bit value 0 can be represented by an interval of approximately 125 microseconds, whereas a bit value of 1 can be represented by an interval of approximately 250 microseconds. In such an example, timing parameters of the tag can be set using the resolution of the clock of the tag, such as a resolution of 32 kHz. Further, the tag can synchronize on each edge of a voltage change. As a result, the protocol is inherently self-clocking and polarity insensitive.

In a particular example, the preamble 702 can be a sequence of bits of the same value, for example, a set of bits having a value of 0 or a set of bits having a value of 1, which precede the message content. The tag generally enables its interface periodically, such as once every 100 microseconds, but can disable the capacitively driven communication circuitry or pins associated with the capacitively driven communication circuitry if the signal is not detected within approximately 500 microseconds. Timing is a function of the expected configuration of the command signal. As a result of the preamble section 702, enough time is provided for the tag to recognize activity so that the interface remains enabled long enough to receive a message. As an example, the preamble 702 can be longer than the interval between activation of the capacitively driven interface, but can be less than two times the interval between activations of the capacitively driven interface. Following the preamble 702, the synchronization section 704 serves as a synchronization marker to indicate the start of a message. The message 706 can include components, such as a key or password that are used to authenticate restricted commands, a command identifying what action the tag is to perform, a payload length, a payload, and a bit sum or cyclic redundancy check (CRC) value to verify the accuracy of the message received. In an example, the command can include a beacon now command, a wake command, a sleep command, a set beacon command, a set identity command, a new identity command, a suspend, a reset tamper, a report high temperature, a report low temperature, a clear high or low temperature, a read memory, a write memory, or any combination thereof. The command can also include a response control bit. For example, the response control bit can include a controller confirmation bit that directs the tag to either respond or not respond with a controller confirmation message, a standard beacon bit that indicates whether the tag is to generate or not generate a standard beacon in response to the message, or other beacon bits that indicate how the tag is to respond or signal its receipt of the message.

In a particular example, the tag processor can determine whether a signal is noise or a command. For example, the processor can determine whether a signal is noise or a command by checking for one or more of sufficient analog level, correct data format and timing, correct message format with meaning, and a valid checksum. In an example, the analog signal is of significant amplitude to affect a detectable voltage change in the CDCC. The sensitivity of the CDCC is low such that common electrical noise sources are not detected. Some such noise sources include electric motors, cathode ray tube displays, and switched inductive loads. In another example, the tag processor expects the relative timing of the signaling pulses to fall within a specific range. Since each data bit is indicated by a signal transition, the lack of a signal transition within a specific amount of time is recognized as an error condition. If the arrival of the signal pulses is too fast or two slow, the processor ignores the pulses and aborts the reception of any message in progress. In an additional example, the messages are long relative to most spurious noise sources so a single impulse noise function or a single static discharge cannot be interpreted as a complete message. If the message can be successfully decoded, the message's COMMAND ID matches one of the commands that the tag understands. Furthermore, certain commands utilize a specific value for a KEY field. If either the COMMAND ID or the KEY does not match one of the expected values, the message is ignored. In a further example, each message can include a 16-bit CRC which is verified by the tag. Messages received with an incorrect CRC are ignored. The inclusion of the CRC in the message greatly reduces the probability that a noise source will produce a valid message.

Figure 8:
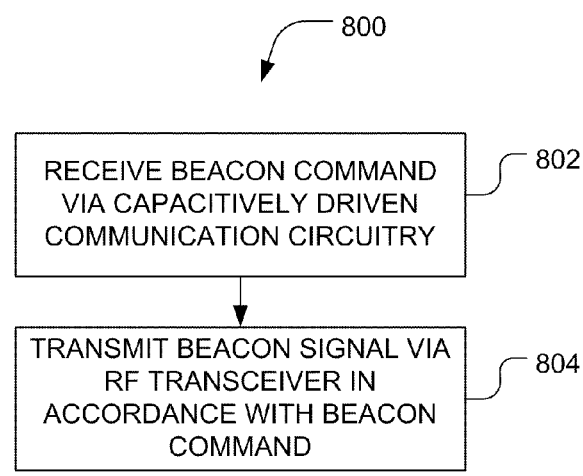
FIG. 8, FIG. 9, FIG. 10, FIG. 11, FIG. 12, and FIG. 13 include illustrations of exemplary methods for use in an asset tracking system.

In operation, the tag can respond in various manners to the commands issued from the controller. For example, according to the method 800 illustrated in FIG. 8, a tag can receive a beacon command via its capacitively driven communication circuitry, as illustrated at 802. In response, the tag can transmit a beacon signal via a radio frequency transmitter in accordance with the beacon command, as illustrated at 804. For example, the beacon command can be a beacon now command directing the tag to transmit immediately, e.g., without waiting for a scheduled time, its identity via the radio frequency transmitter. In another example, the beacon now command can direct the tag to transmit additional data along with its identity.

Figure 9:
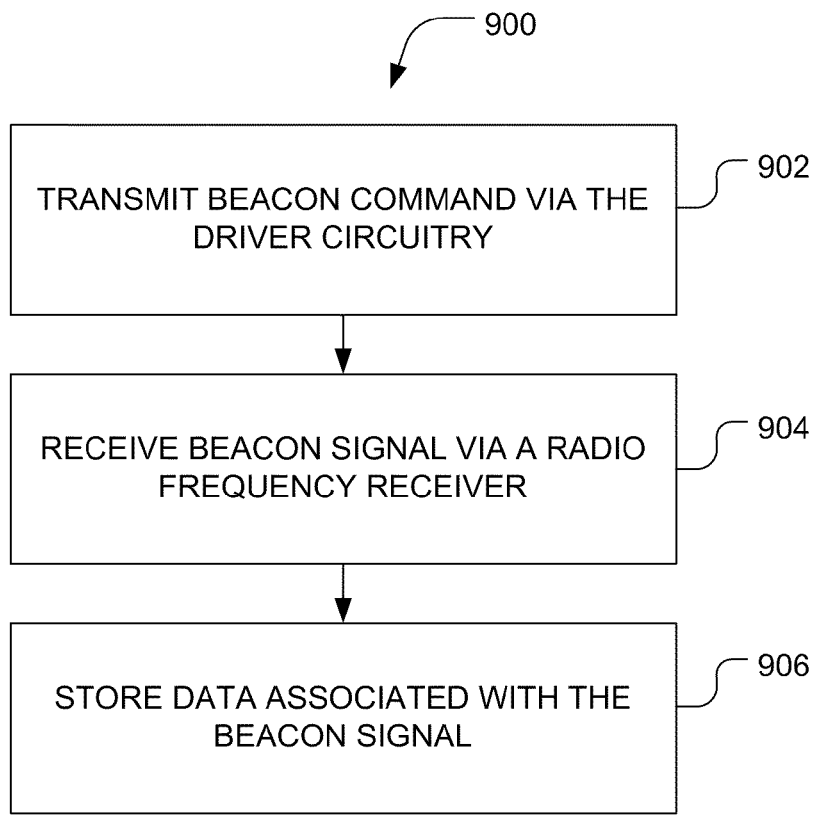

To facilitate such a transmission, a controller can transmit the beacon command via a driver circuitry, as illustrated at 902 of the method 900 illustrated in FIG. 9. In response, a tag that receives the beacon command can transmit via a radio frequency transmitter the beacon signal that is received via a radio frequency receiver, as illustrated at 904. For example, the controller can include a radio frequency receiver and communicate the received command to a host computer. Alternatively, the host computer can be coupled to a wide area reader or antenna that receives the beacon response signal.

In a particular example, when configuring the tag to be associated with an asset to be tracked, the system can store the data associated with the beacon response signal, as illustrated at 906. For example, the host computer can store in a database the tag's identity and allow an association of the tag's identity with an asset to be tracked.

Figure 10:
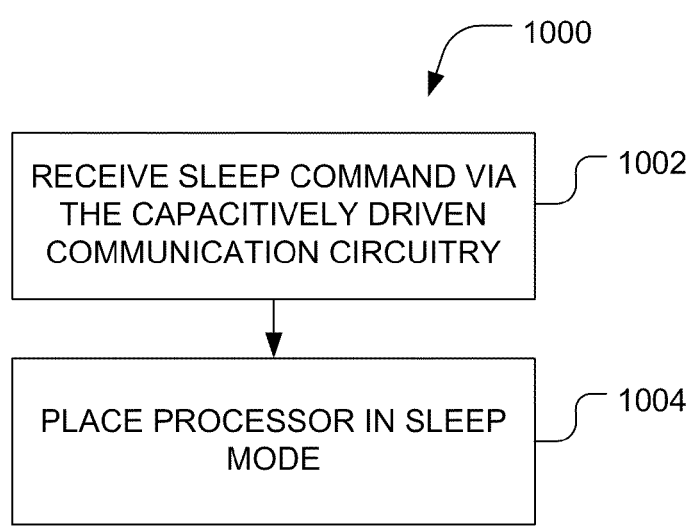

In another embodiment, the tag can be directed to enter a sleep mode in which various circuitries of the tag or portions of one or more tag processors are deactivated or powered down. For example, as illustrated in the method 1000 of FIG. 10, a tag can receive a sleep command via its capacitively driven communication circuitry, as illustrated at 1002. In response, the tag can place various circuitries, such as communication circuitries, and at least a portion of a tag processor in sleep mode, as illustrated in 1004. Optionally, the tag can transmit a signal prior to powering down to confirm receipt of the sleep command. Accordingly, the tag can enter a mode in which power consumption is significantly reduced. Further, sleep mode can incorporate a periodic activation of a portion of the tag processor associated with the capacitively driven communication circuitry to determine whether a further command, such as a wake command, is received.

Figure 11:
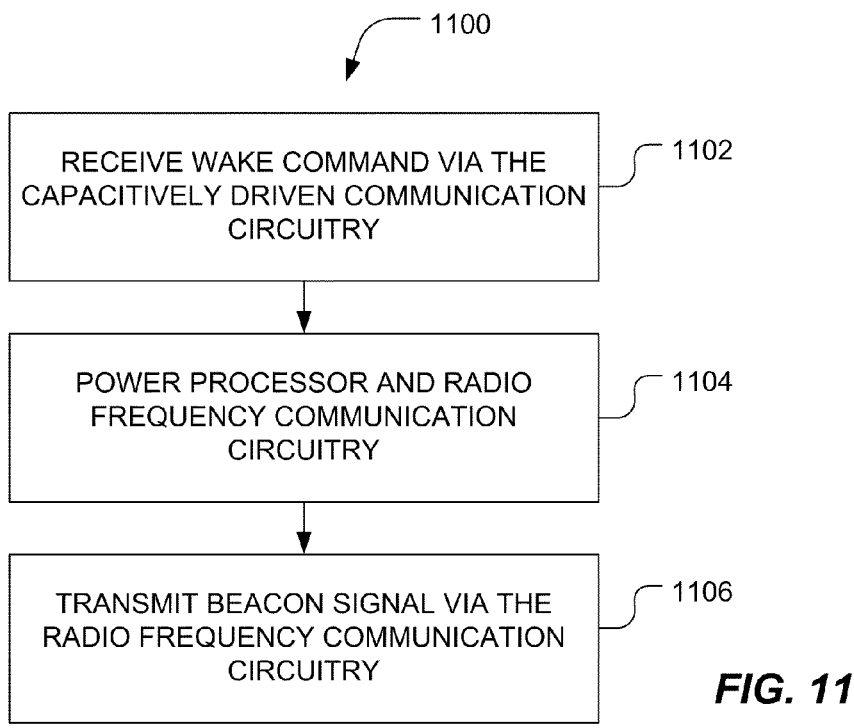

For example, as illustrated in method 1100 of FIG. 11, a tag can receive a wake command via its capacitively driven communication circuitry, as illustrated at 1102. As discussed above, an exemplary tag processor can include one or more pins coupled to the capacitively driven communication circuitry that are periodically powered to determine whether voltage changes are occurring in the capacitively driven communication circuitry.

In response to receiving a wake command, the tag processor can power portions that have been placed into low power consumption mode or have been powered down, as illustrated at 1104. Optionally, the tag can transmit a response message via a radio frequency transmitter, as illustrated at 1106. For example, in response to the wake command, the tag can power communication circuitry, such as the radio frequency transceiver, and can transmit a response to the wake command immediately or can transmit periodic beacons in accordance with its configuration.

Figure 12:
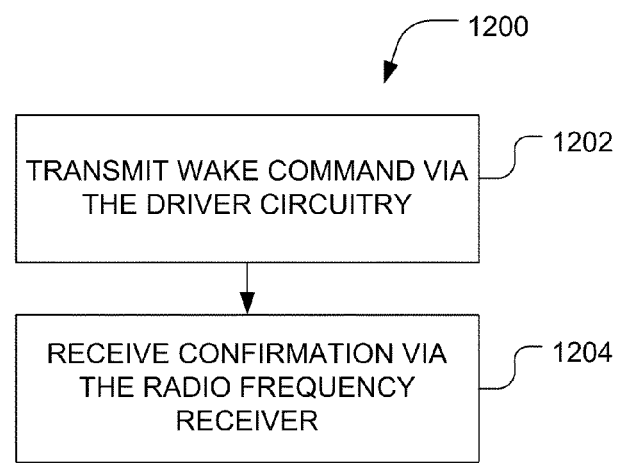

To facilitate waking of the tag, a controller can transmit a wake command via a driver circuitry, as illustrated at 1202 of the method 1200 illustrated in FIG. 12. Depending upon the response configuration of the tag, the system can receive a confirmation message or a standard beacon message via the radio frequency receiver, as illustrated in 1204. For example, when the controller includes a radio frequency receiver, the controller can receive a confirmation message or a standard beacon message and can transmit the message to a host computer. Alternatively, the host computer can be coupled to an antenna and can receive the response message or a standard beacon message via the antenna.

Figure 13:
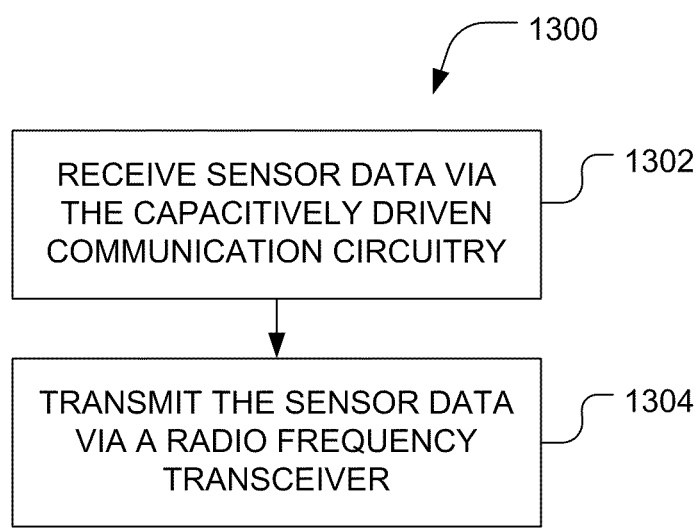

In a particular embodiment, the tag can be coupled to a sensor device. The sensor device can include voltage pads to drive a capacitive drive communication circuitry of an attached tag. Accordingly, the sensor can transmit sensor data to the tag's capacitively driven communication circuitry. As illustrated in FIG. 13, the method 1300 includes receiving sensor data via capacitively driven communication circuitry at a tag, as illustrated at 1302. The tag can transmit the sensor data via a radio frequency transmitter, as illustrated at 1304. For example, the tag can transmit the sensor data as part of a standard radio frequency transmission. Alternatively, the sensor data can be transmitted upon receipt.

In particular, embodiments of the tags described above are particularly useful in various applications. For example, as part of inventory control or as part of a point of sales scanning, a tag controller with the driver circuitry can direct a tag to beacon immediately providing an immediate radio frequency transmission from the tag as opposed to waiting until the tag transmits as part of the periodic signaling. Further, utilizing the sleep command, tags can be decommissioned and recycled, conserving power when the tag is not in use.

In a particular embodiment, when tags are associated with consumables or perishables, such as drugs, a user, such as a pharmacist, can direct the tag to stop beaconing and stop transmitting data when the tag is not in use.

In another example, the tags can be useful in security situations in which the tags are associated with security personnel. For example, security personnel can check in at fixed locations by waving a badge that includes a tag in proximity to a controller. The tag includes the capacitive driven communication circuitry. As a result, the tag can beacon or transmit a radio frequency signal, indicating check in at the location. Because the capacitively driven communication circuitry operates only within limited distances, the security personnel activate the tag when in close proximity to the capacitively driven communication circuitry and cannot activate the tag transmission if not in close proximity.

Further, such tags and controllers can be useful at portals. As the tag passes through the portal it can be directed to beacon immediately through a beacon now command, or the tag can be directed to wake up and begin transmitting periodically. Accordingly, asset tracking can be activated as an asset leaves a particular location. In a particular embodiment, such tracking can be used to track equipment for billing purposes. For example, when equipment is checked into a storage room, a tag can be deactivated. However, when the equipment is checked out of the storage room, the tag can be activated and can periodically signal its location within a facility, such as a hospital. In another example, a tag attached to a drug container can be activated when the drug container leaves storage.

In another example, the tag can be useful in near stack environments where equipment rarely moves. As such, the tag can be activated when it leaves the stack. In another example, the tag can be directed to beacon less frequently or with greater strength when the tag operates in close proximity environments, such as equipment racks that can dampen radio frequency signals.

In another example, patients can be provided with an enabled tag to determine their location. If the patient moves to different parts of a hospital, for example, the tag can be directed to beacon immediately or to check the patient into that facility, as well as, providing periodic signals to provide a general location of the patient. Further, once the patient leaves the hospital, the tag can be placed in sleep mode, conserving power within the tag.

In an additional embodiment, the tag can be configured to transmit or relay data. For example, the tag can be coupled with a sensor, such as a temperature sensor, a gas pressure monitor, or other data logger, that communicates with the tag via the capacitively driven communication circuitry. Because the tag is cost effective and customizable, the tag can communicate over a radio frequency channel the data received via the capacitively driven communication circuitry from the sensor.

In a further example, the tags can be mass produced, maintained in a sleep mode, and programmed as they are deployed. As such, the manufacturing environment can have low radio frequency noise. Further, in the manufacturing environment, the tags are provided with a bidirectional interface. The tags can be configured on demand. Further, the tags can be commanded to beacon or respond immediately during testing, without waiting a programmed interval between beacon transmissions. In addition, the tags can be transported without concern about creating radio frequency noise, and deployment facilities can manage a large volume of tags without concern about signal collisions.

In an additional example, the system can be used during tag manufacturing. In particular, the system provides bidirectional communication with tags. Such bidirectional communication, particularly with immediate response from the tag, can increase the speed of testing. In addition, such bidirectional communication can be used to configure tags, such as configuring beacon transmissions and transmission timing. In addition, such bidirectional communication can be used to provide data for transmission as a payload in a beacon signal.

In a particular example, bidirectional communication can be used to transfer sensor data from a controller or a sensor including drive circuitry. An exemplary sensor can include a scale, a gas leak sensor, a temperature sensor, a pressure sensor, another sensor, a data logger, or a combination thereof. Such a system permits communication of data using a tag without the need for configuration or coding. A tag can be attached to a sensor having a drive circuitry. As such, the tags can be interexchanged and attached to sensors or other devices with drive circuitries. Data transferred to the tags can be transmitted in beacon signals to a wide area network.

Additionally, embodiments of the tag, controller, or sensor described above can be configured in a sealed housing without a physical connection port. Such sealed devices can be more durable and resistant to exposure to the environment and can be made more impact resistant. Further, such tags represent an example of a portable device that can benefit from circuitry, such as a capacitively driven communications circuitry.

In a first aspect, a tag includes a processor, a radio frequency transmitter coupled to the processor, and a capacitively driven communication circuitry coupled to the processor. The processor is to energize the capacitively driven communication circuitry to receive a serial set of binary bits via the capacitively driven communication circuitry.

In an example of the first aspect, the capacitively driven communication circuitry includes first and second resistors coupled in parallel between a first pin of the processor and ground, and a pad electrically connected between the first and second resistors. A second pin of the processor is electrically connected between the first and second resistors.

In another example of the first aspect, the tag further includes an infrared receiver coupled to the processor. In an additional example, the serial set of binary bits is formed by a series of voltages changes in the capacitively driven communication circuitry. A first binary value is represented by a first period between voltage changes and a second binary value is represented by a second period between voltage changes. Further, the serial set of binary bits can form a beacon command. The processor can initiate transmission of a beacon signal via the radio frequency transmitter in response to the beacon command without delaying for a period associated with periodic transmission. The beacon command can include a data parameter. The beacon signal includes the data parameter.

In a further example, the serial set of binary bits can form a sleep command. The processor can power down at least a portion of the processor in response to the sleep command. In an additional example, the serial set of binary bits can form a wake command, and the processor can power the radio frequency transmitter in response to the wake command. In a particular example, the processor periodically energizes the capacitively driven communication circuitry.

In another example, the processor transmits a low information signal in response to a command received by the capacitively driven communication circuitry.

In a second aspect, a controller includes a processor, a drive circuitry communicatively coupled to the processor, first and second voltage pads coupled to the drive circuitry, and a mode button communicatively coupled to the processor. In response to depression of the mode button, the processor can control the drive circuitry to manipulate charge on the first and second voltage pads in a pattern characteristic of a serial set of binary bits. In an example of the second aspect, the first and second voltage pads are separately addressable. The drive circuitry can initiate charge of equal magnitude and opposite charge on the first and second voltage pads.

In a further example of the second aspect, the controller further includes an interface to a computer. The interface is coupled to the processor. In another example, the controller further includes a user interface coupled to the processor.

In an additional example, the serial set of binary bits is characterized by a change in the charge on the first and second voltage pads. A first binary value is represented by a first period between changes, and a second binary value is represented by a second period between changes.

The controller can also include a radio frequency receiver. The radio frequency receiver can receive a low information signal from a tag.

In another example, the processor can initiate a beacon now command via the drive circuitry. In a further example, the processor can initiate a signal from a tag including payload data provided by the controller via the drive circuitry. In an additional example, the processor can initiate a low information signal via the drive circuitry.

In a third aspect, a system includes a tag and a controller. The tag includes a tag processor, a radio frequency transmitter coupled to the tag processor, and a capacitively driven communication circuitry coupled to the tag processor. The tag processor energizes the capacitively driven communication circuitry to receive a serial set of binary bits via the capacitively driven communication circuitry. The controller includes a controller processor, a drive circuitry communicatively coupled to the controller processor, and first and second voltage pads coupled to the drive circuitry. The controller processor controls the drive circuitry to manipulate charge on the first and second voltage pads in a pattern characteristic of a serial set of binary bits.

In an example of the third aspect, the tag further includes an infrared receiver coupled to the tag processor. The system can include an infrared beacon device. For example, the infrared beacon device transmits a location code to be received by the infrared receiver of the tag.

In another example of the third aspect, the system further includes a host computer coupled to a radio frequency reader. The tag processor directs the radio frequency transmitter to transmit a signal to be received by the radio frequency reader. The signal can include a tag identification. The host computer can store the tag identification number. In a further example, the controller includes a radio frequency receiver. The controller initiates a low information signal to be sent from a tag to be received by the radio frequency receiver. The low information signal is not recognizable by the radio frequency reader.

In an additional example of the third aspect, the controller further includes a radio frequency receiver. In another example, the controller can provide a beacon now command to the tag via the drive circuitry. In a further example, the controller can provide payload data to the tag via the drive circuitry. The payload data can be included in a signal to be transmitted from the tag.

In a fourth aspect, a method of preparing a tag includes receiving a sleep command from a controller via a capacitively driven communication circuitry, and powering down a radio transmitter and at least a portion of a processor based at least in part on the sleep command. In an example, the method further includes receiving a password with the sleep command via the capacitively driven communication circuitry. In another example, the method includes powering down an infrared receiver based at least in part on the sleep command. In an additional example, the method includes transmitting a response signal via the radio frequency transmitter prior to powering down based at least in part on the sleep command.

In a fifth aspect, a method of preparing a tag includes receiving a beacon now command from a controller at a tag via a capacitively driven communication circuitry. The tag includes a processor, a radio frequency transmitter communicatively coupled to the processor, and the capacitively driven circuitry coupled to the processor. The tag has a normal mode in which the tag periodically transmits a signal via the radio frequency transmitter. The method further includes transmitting a signal including a tag identification without initiating the normal mode.

In a sixth aspect, a method of preparing a tag includes receiving a wake command from a controller at a tag via a capacitively driven communication circuitry. The tag includes a processor, a radio frequency transmitter communicatively coupled to the processor, and the capacitively driven circuitry coupled to the processor. The method further includes powering at least a portion of the processor and the radio frequency transmitter based at least in part on the wake command, and transmitting a signal including a tag identification.

In a seventh aspect, a method of transmitting sensor data includes receiving sensor data from a sensor via a capacitively driven communication circuitry of a tag and transmitting a signal via a radio frequency transmitter from the tag. The signal includes a tag identification and the sensor data.

In an eighth aspect, a radio frequency tag includes a processor, a radio frequency transmitter coupled to the processor, and a capacitively driven communication circuitry coupled to the processor. The processor can implement a beacon now mode, a payload mode, and a low information signal mode based at least in part on a command signal received via the capacitively driven communication circuitry.

In a ninth aspect, a method of conserving energy in a radio frequency identification tag includes periodically energizing a capacitively driven communication circuitry of the radio frequency identification tag. The capacitively driven communication circuitry can receive a serial set of binary bits. The radio frequency identification tag is in a low power mode. The method further includes receiving a wake command via the capacitively driven communication circuitry and providing power to components of the radio frequency identification tag based at least in part on the wake command.

In a tenth aspect, a method of preparing a radio frequency identification tag includes providing tag identification parameters to the radio frequency identification tag via a capacitively drive communication circuitry of the radio frequency identification tag and providing a sleep command to the radio frequency identification tag via the capacitively driven communication circuitry. The radio frequency identification tag switches to a low power mode in response to the sleep command.

In an example of the tenth aspect, the method further includes providing a beacon now command to the radio frequency identification tag via the capacitively driven communication circuitry. The radio frequency identification tag can transmit a beacon signal in response to the beacon now command.

In a further example of the tenth aspect, the radio frequency identification tag can transmit a low information signal in response to receiving the sleep command prior to switching to the low power mode.

In an eleventh aspect, a method of correlating an event with a radio frequency identification tag includes providing payload data to the radio frequency identification tag via a capacitively driven communication circuitry of the radio frequency identification tag. The payload data is associated with a controller. The method further includes transmitting a beacon signal from the radio frequency identification tag to be received by a wide area receiver. The beacon signal includes the payload data. In an example, the controller is associated with a physical location. In another example, transmitting the beacon signal includes transmitting the beacon signal immediately upon receipt of the payload data prior to a time scheduled for transmission.

In a twelfth aspect, a method of programming a radio frequency identification tag includes providing a password, command, and a tag parameter to the radio frequency identification tag via a capacitively driven communication circuitry of the radio frequency identification tag, and transmitting a response signal from the radio frequency identification tag to confirm implementation of the tag parameters. In an example, the tag parameter is associated with operational features of the radio frequency identification tag. For example, the operational feature can include a beacon rate, beacon message content, message formatting, signal strength, or any combination thereof. In another example, the tag parameter includes a tag identification.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A system comprising:
   a tag comprising:
      a tag processor;
      a radio frequency transmitter coupled to the tag processor; and
      a capacitively driven communication circuitry coupled to the tag processor, the tag processor to energize the capacitively driven communication circuitry to receive a serial set of binary bits via the capacitively driven communication circuitry;
   a host computer coupled to a radio frequency reader, the tag processor to direct the radio frequency transmitter to transmit a signal to be received by the radio frequency reader; and
   a controller comprising:
      a controller processor;
      a drive circuitry communicatively coupled to the controller processor;
      first and second voltage pads coupled to the drive circuitry, the controller processor to control the drive circuitry to manipulate charge on the first and second voltage pads in a pattern characteristic of a serial set of binary bits; and
      a radio frequency receiver, the controller to initiate a low information signal to be sent from a tag to be received by the radio frequency receiver, the low information signal not recognizable by the radio frequency reader.

2. The system of claim 1, wherein the tag further comprises an infrared receiver coupled to the tag processor.

3. The system of claim 2, further comprising an infrared beacon device.

4. The system of claim 3, wherein the infrared beacon device is to transmit a location code to be received by the infrared receiver of the tag.

* * * * *